United States Patent
Gammel et al.

(10) Patent No.: US 12,169,448 B2
(45) Date of Patent: Dec. 17, 2024

(54) DEVICE AND METHODS FOR PROCESSING BIT STRINGS

(71) Applicant: Infineon Technologies AG, Neubiberg (DE)

(72) Inventors: Berndt Gammel, Markt-Schwaben (DE); Bernd Meyer, Munich (DE)

(73) Assignee: Infineon Technologies AG, Neubiberg (DE)

(*) Notice: Subject to any disclaimer, the term of this patent is extended or adjusted under 35 U.S.C. 154(b) by 89 days.

(21) Appl. No.: 17/551,654

(22) Filed: Dec. 15, 2021

(65) Prior Publication Data

US 2022/0188216 A1   Jun. 16, 2022

(30) Foreign Application Priority Data

Dec. 16, 2020   (DE) .................... 102020216072.4

(51) Int. Cl.
  G06F 11/36   (2006.01)
  G06F 9/445   (2018.01)

(52) U.S. Cl.
  CPC ...... *G06F 11/3612* (2013.01); *G06F 9/44505* (2013.01)

(58) Field of Classification Search
  CPC .................................................. G06F 11/362
  See application file for complete search history.

(56) References Cited

U.S. PATENT DOCUMENTS

| | | | | |
|---|---|---|---|---|
| 4,599,722 A * | 7/1986 | Mortimer | ............ | H03M 13/033 |
| | | | | 714/776 |
| 5,526,296 A * | 6/1996 | Nakahara | ................ | G06F 7/764 |
| | | | | 712/300 |
| 6,195,774 B1 * | 2/2001 | Jacobson | ....... | G01R 31/318591 |
| | | | | 714/725 |
| 7,580,525 B1 * | 8/2009 | Ejima | ............... | H04L 25/03866 |
| | | | | 380/268 |
| 10,652,281 B1 * | 5/2020 | Moolenaar | .......... | H04L 63/0236 |
| 11,714,605 B2 * | 8/2023 | Ramesh | .............. | G06F 7/49915 |
| | | | | 708/505 |
| 2003/0014709 A1 * | 1/2003 | Miyoshi | ................ | H04L 1/0068 |
| | | | | 714/748 |
| 2003/0074501 A1 * | 4/2003 | Anzai | .................... | G06K 15/00 |
| | | | | 710/72 |
| 2004/0027948 A1 * | 2/2004 | Tonami | ............ | G11B 20/10037 |

(Continued)

FOREIGN PATENT DOCUMENTS

DE           69714507 T2    4/2003

OTHER PUBLICATIONS

German Patent Office, Office Action issued for DE 102020216072. 4, 7 pgs., dated: Aug. 24, 2021.

(Continued)

*Primary Examiner* — Jae U Jeon
(74) *Attorney, Agent, or Firm* — Banner & Witcoff Ltd.

(57) ABSTRACT

A device for processing bit strings of a program flow including a data memory and an interface that is designed to output a second bit string, and a bit string manipulator that is designed to analyze the first bit string at a predetermined bit string section for information that indicates a target state of the program flow, and to manipulate the first bit string in the bit string section to obtain the second bit string.

20 Claims, 13 Drawing Sheets

(56) References Cited

U.S. PATENT DOCUMENTS

| | | | | |
|---|---|---|---|---|
| 2004/0098579 A1* | 5/2004 | Nakano | .................. | G06F 21/10 |
| | | | | 713/150 |
| 2004/0225861 A1* | 11/2004 | Brognara | ........... | H04N 1/32475 |
| | | | | 711/217 |
| 2010/0088515 A1* | 4/2010 | Nishimoto | ....... | H04N 21/42623 |
| | | | | 380/278 |
| 2010/0186001 A1* | 7/2010 | Teng | .................. | G06F 11/3636 |
| | | | | 717/110 |
| 2013/0041951 A1* | 2/2013 | Lee | ....................... | H04L 63/083 |
| | | | | 709/204 |
| 2014/0237013 A1* | 8/2014 | Yan | ......................... | G06F 7/584 |
| | | | | 708/252 |
| 2014/0244776 A1* | 8/2014 | Chen | .................... | H04L 67/125 |
| | | | | 709/211 |
| 2015/0378674 A1* | 12/2015 | Ruff | ........................ | H03M 7/06 |
| | | | | 708/204 |
| 2016/0179647 A1* | 6/2016 | Das Sharma | ......... | G06F 11/221 |
| | | | | 714/736 |
| 2017/0372046 A1* | 12/2017 | Thomee | ............... | H04L 63/0442 |
| 2019/0196939 A1* | 6/2019 | Lengauer | ............. | G06F 11/3495 |
| 2019/0391807 A1* | 12/2019 | Inagaki | .................. | G06N 10/00 |

OTHER PUBLICATIONS

M. Schuette, et al., "Processor Control Flow Monitoring Using Signatured Instruction Streams", 13 pgs., IEEE Transactions on Computers, vol. C-36, No. 3, Mar. 1987.

\* cited by examiner

| Bit 31 | RV32I Base instruction set | | 12 | 11 | 7 | 6 $b_6$ $b_3 b_2$ 0 | | 30₁ |
|---|---|---|---|---|---|---|---|---|
| imm[31:12] | | | | rd | | 0110111 | LUI | |
| imm[31:12] | | | | rd | | 0010111 | AUIPC | |
| imm[20\|10:1\|11\|19:12] | | | | rd | | 1101111 | JAL | |
| imm[11:0] | | | rs1 | 000 | rd | 1100111 | JALR | |
| imm[12\|10:5] | rs2 | rs1 | 000 | imm[4:1\|11] | | 1100011 | BEQ | |
| imm[12\|10:5] | rs2 | rs1 | 001 | imm[4:1\|11] | | 1100011 | BNE | |
| imm[12\|10:5] | rs2 | rs1 | 100 | imm[4:1\|11] | | 1100011 | BLT | |
| imm[12\|10:5] | rs2 | rs1 | 101 | imm[4:1\|11] | | 1100011 | BGE | |
| imm[12\|10:5] | rs2 | rs1 | 110 | imm[4:1\|11] | | 1100011 | BLTU | |
| imm[12\|10:5] | rs2 | rs1 | 111 | imm[4:1\|11] | | 1100011 | BGEU | |
| imm[11:0] | | | rs1 | 000 | rd | 0000011 | LB | ⎫ |
| imm[11:0] | | | rs1 | 001 | rd | 0000011 | LH | |
| imm[11:0] | | | rs1 | 010 | rd | 0000011 | LW | |
| imm[11:0] | | | rs1 | 100 | rd | 0000011 | LBU | |
| imm[11:0] | | | rs1 | 101 | rd | 0000011 | LHU | |
| imm[11:5] | rs2 | rs1 | 000 | imm[4:0] | | 0100011 | SB | |
| imm[11:5] | rs2 | rs1 | 001 | imm[4:0] | | 0100011 | SH | |
| imm[11:5] | rs2 | rs1 | 010 | imm[4:0] | | 0100011 | SW | |
| imm[11:0] | | | rs1 | 000 | rd | 0010011 | ADDI | |
| imm[11:0] | | | rs1 | 010 | rd | 0010011 | SLTI | |
| imm[11:0] | | | rs1 | 011 | rd | 0010011 | SLTIU | |
| imm[11:0] | | | rs1 | 100 | rd | 0010011 | XORI | |
| imm[11:0] | | | rs1 | 110 | rd | 0010011 | ORI | |
| imm[11:0] | | | rs1 | 111 | rd | 0010011 | ANDI | ⎬ 42 |
| 0000000 | shamt | rs1 | 001 | rd | | 0010011 | SLLI | |
| 0000000 | shamt | rs1 | 101 | rd | | 0010011 | SRLI | |
| 0100000 | shamt | rs1 | 101 | rd | | 0010011 | SRAI | |
| 0000000 | rs2 | rs1 | 000 | rd | | 0110011 | ADD | |
| 0100000 | rs2 | rs1 | 000 | rd | | 0110011 | SUB | |
| 0000000 | rs2 | rs1 | 001 | rd | | 0110011 | SLL | |
| 0000000 | rs2 | rs1 | 010 | rd | | 0110011 | SLT | |
| 0000000 | rs2 | rs1 | 011 | rd | | 0110011 | SLTU | |
| 0000000 | rs2 | rs1 | 100 | rd | | 0110011 | XOR | |
| 0000000 | rs2 | rs1 | 101 | rd | | 0110011 | SRL | |
| 0100000 | rs2 | rs1 | 101 | rd | | 0110011 | SRA | |
| 0000000 | rs2 | rs1 | 110 | rd | | 0110011 | OR | |
| 0000000 | rs2 | rs1 | 111 | rd | | 0110011 | AND | ⎭ |

Fig. 3a
(Part 1)

(Part 2)

RV64I Base instruction set (as an extension to RV32I)

| Bit 31 | | | 19 | 14 | 12|11 | 7|6 | 0 | |
|---|---|---|---|---|---|---|---|---|---|
| imm[11:0] | | | rs1 | 110 | rd | 0000011 | LWU |
| imm[11:0] | | | rs1 | 011 | rd | 0000011 | LD |
| imm[11:5] | | rs2 | rs1 | 011 | imm[4:0] | 0100011 | SD |
| 000000 | | shamt | rs1 | 001 | rd | 0010011 | SLLI |
| 000000 | | shamt | rs1 | 101 | rd | 0010011 | SRLI |
| 010000 | | shamt | rs1 | 101 | rd | 0010011 | SRAI |
| imm[11:0] | | | rs1 | 000 | rd | 0011011 | ADDIW |
| 000000 | | shamt | rs1 | 001 | rd | 0011011 | SLLIW |
| 000000 | | shamt | rs1 | 101 | rd | 0011011 | SRLIW |
| 010000 | | shamt | rs1 | 101 | rd | 0011011 | SRAIW |
| 000000 | | rs2 | rs1 | 000 | rd | 0111011 | ADDW |
| 010000 | | rs2 | rs1 | 000 | rd | 0111011 | SUBW |
| 000000 | | rs2 | rs1 | 001 | rd | 0111011 | SLLW |
| 000000 | | rs2 | rs1 | 101 | rd | 0111011 | SRLW |
| 010000 | | rs2 | rs1 | 101 | rd | 0111011 | SRAW | b₀ → bit 0
b₁ → bit 1

Fig. 3b

RV32M standard extension

| 31 | 25 | 24 | 20 | 19 | 15 | 14 | 12 | 11 | 7 | 6 | 0 | |
|---|---|---|---|---|---|---|---|---|---|---|---|---|
| 0000001 | | rs2 | | rs1 | | 000 | | rd | | 0110011 | | MUL |
| 0000001 | | rs2 | | rs1 | | 001 | | rd | | 0110011 | | MULH |
| 0000001 | | rs2 | | rs1 | | 010 | | rd | | 0110011 | | MULHSU |
| 0000001 | | rs2 | | rs1 | | 011 | | rd | | 0110011 | | MULHU |
| 0000001 | | rs2 | | rs1 | | 100 | | rd | | 0110011 | | DIV |
| 0000001 | | rs2 | | rs1 | | 101 | | rd | | 0110011 | | DIVU |
| 0000001 | | rs2 | | rs1 | | 110 | | rd | | 0110011 | | REM |
| 0000001 | | rs2 | | rs1 | | 111 | | rd | | 0110011 | | REMU |

Fig. 4a

RV64M standard extension (as an extension to RV32M)

| 31 | 25 | 24 | 20 | 19 | 15 | 14 | 12 | 11 | 7 | 6 | 0 | |
|---|---|---|---|---|---|---|---|---|---|---|---|---|
| 0000001 | | rs2 | | rs1 | | 000 | | rd | | 0111011 | | MULW |
| 0000001 | | rs2 | | rs1 | | 100 | | rd | | 0111011 | | DIVW |
| 0000001 | | rs2 | | rs1 | | 101 | | rd | | 0111011 | | DIVUW |
| 0000001 | | rs2 | | rs1 | | 110 | | rd | | 0111011 | | REMW |
| 0000001 | | rs2 | | rs1 | | 111 | | rd | | 0111011 | | REMUW |

Fig. 4b

RV32A standard extension

| Bit | 31 27 | 26 | 25 | 24 20 | 19 15 | 14 12 | 11 7 | 6 0 | |
|---|---|---|---|---|---|---|---|---|---|
| | 00010 | aq | rl | 00000 | rs1 | 010 | rd | 0101111 | LR.W |
| | 00011 | aq | rl | rs2 | rs1 | 010 | rd | 0101111 | SC.W |
| | 00001 | aq | rl | rs2 | rs1 | 010 | rd | 0101111 | AMOSWAP.W |
| | 00000 | aq | rl | rs2 | rs1 | 010 | rd | 0101111 | AMOADD.W |
| | 00100 | aq | rl | rs2 | rs1 | 010 | rd | 0101111 | AMOXOR.W |
| | 01100 | aq | rl | rs2 | rs1 | 010 | rd | 0101111 | AMOAND.W |
| | 01000 | aq | rl | rs2 | rs1 | 010 | rd | 0101111 | AMOOR.W |
| | 10000 | aq | rl | rs2 | rs1 | 010 | rd | 0101111 | AMOMIN.W |
| | 10100 | aq | rl | rs2 | rs1 | 010 | rd | 0101111 | AMOMAX.W |
| | 11000 | aq | rl | rs2 | rs1 | 010 | rd | 0101111 | AMOMINU.W |
| | 11100 | aq | rl | rs2 | rs1 | 010 | rd | 0101111 | AMOMAXU.W |

| 31 | 27 | 26 | 25 | 24 | 20 | 19 | 15 | 14 | 12 | 11 | 7 | 6 | 0 | |
|---|---|---|---|---|---|---|---|---|---|---|---|---|---|---|
| funct7 | | | | rs2 | | rs1 | | funct3 | | rd | | opcode | | R-type |
| rs3 | | funct2 | | rs2 | | rs1 | | funct3 | | rd | | opcode | | R4-type |
| imm[11:0] | | | | | | rs1 | | funct3 | | rd | | opcode | | I-type |
| imm[11:5] | | | | rs2 | | rs1 | | funct3 | | imm[4:0] | | opcode | | S-type |

Fig. 5a

RV64A standard extension (as an extension to RV32A)

| Bit 31 | 27 | 26 | 25 | 24 | 20 | 19 | 15 | 14 | 12 | 11 | 7 | 6 | 0 | |
|---|---|---|---|---|---|---|---|---|---|---|---|---|---|---|
| 00010 | | aq | rl | 00000 | | rs1 | | 011 | | rd | | 0101111 | | LR.D |
| 00011 | | aq | rl | rs2 | | rs1 | | 011 | | rd | | 0101111 | | SC.D |
| 00001 | | aq | rl | rs2 | | rs1 | | 011 | | rd | | 0101111 | | AMOSWAP.D |
| 00000 | | aq | rl | rs2 | | rs1 | | 011 | | rd | | 0101111 | | AMOADD.D |
| 00100 | | aq | rl | rs2 | | rs1 | | 011 | | rd | | 0101111 | | AMOXOR.D |
| 01100 | | aq | rl | rs2 | | rs1 | | 011 | | rd | | 0101111 | | AMOAND.D |
| 01000 | | aq | rl | rs2 | | rs1 | | 011 | | rd | | 0101111 | | AMOOR.D |
| 10000 | | aq | rl | rs2 | | rs1 | | 011 | | rd | | 0101111 | | AMOMIN.D |
| 10100 | | aq | rl | rs2 | | rs1 | | 011 | | rd | | 0101111 | | AMOMAX.D |
| 11000 | | aq | rl | rs2 | | rs1 | | 011 | | rd | | 0101111 | | AMOMINU.D |
| 11100 | | aq | rl | rs2 | | rs1 | | 011 | | rd | | 0101111 | | AMOMAXU.D |

RV32F standard extension

| | | | | | | b₁ b₀ ↓↓ | |
|---|---|---|---|---|---|---|---|
| imm[11:0] | | rs1 | 010 | rd | | 0000111 | FLW |
| imm[11:5] | rs2 | rs1 | 010 | imm[4:0] | | 0100111 | FSW |
| rs3 | 00 | rs2 | rs1 | rm | rd | 1000011 | FMADD.S |
| rs3 | 00 | rs2 | rs1 | rm | rd | 1000011 | FMSUB.S |
| rs3 | 00 | rs2 | rs1 | rm | rd | 1001011 | FNMSUB.S |
| rs3 | 00 | rs2 | rs1 | rm | rd | 1001111 | FNMADD.S |
| 0000000 | | rs2 | rs1 | rm | rd | 1010011 | FADD.S |
| 0000100 | | rs2 | rs1 | rm | rd | 1010011 | FSUB.S |
| 0001000 | | rs2 | rs1 | rm | rd | 1010011 | FMUL.S |
| 0001100 | | rs2 | rs1 | rm | rd | 1010011 | FDIV.S |
| 0101100 | | 00000 | rs1 | rm | rd | 1010011 | FSQRT.S |
| 0010000 | | rs2 | rs1 | 000 | rd | 1010011 | FSGNJ.S |
| 0010000 | | rs2 | rs1 | 001 | rd | 1010011 | FSGNJN.S |
| 0010000 | | rs2 | rs1 | 010 | rd | 1010011 | FSGNJX.S |
| 0010100 | | rs2 | rs1 | 000 | rd | 1010011 | FMIN.S |
| 0010100 | | rs2 | rs1 | 001 | rd | 1010011 | FMAX.S |
| 1100000 | | 00000 | rs1 | rm | rd | 1010011 | FCVT.W.S |
| 1100000 | | 00001 | rs1 | rm | rd | 1010011 | FCVT.WU.S |
| 1110000 | | 00000 | rs1 | 000 | rd | 1010011 | FMV.X.W |
| 1010000 | | rs2 | rs1 | 010 | rd | 1010011 | FEQ.S |
| 1010000 | | rs2 | rs1 | 001 | rd | 1010011 | FLT.S |
| 1010000 | | rs2 | rs1 | 000 | rd | 1010011 | FLE.S |
| 1110000 | | 00000 | rs1 | 001 | rd | 1010011 | FCLASS.S |
| 1101000 | | 00000 | rs1 | rm | rd | 1010011 | FCVT.S.W |
| 1101000 | | 00001 | rs1 | rm | rd | 1010011 | FCVT.S.WU |
| 1111000 | | 00000 | rs1 | 000 | rd | 1010011 | FMV.W.X |

Bit | 31   27 | 26   25 | 24   20 | 19   15 | 14   12 | 11   7 | 6   0 | |
|---|---|---|---|---|---|---|---|---|
| | funct7 | | rs2 | rs1 | funct3 | rd | opcode | R-type |
| | rs3 | funct2 | rs2 | rs1 | funct3 | rd | opcode | R4-type |
| | imm[11:0] | | | rs1 | funct3 | rd | opcode | I-type |
| | imm[11:5] | | rs2 | rs1 | funct3 | imm[4:0] | opcode | S-type |

Fig. 6a

RV64F standard extension (as an extension to RV32F)

| Bit | 31    25 | 24    20 | 19    15 | 14  12 | 11   7 | 6      0 |         |
|-----|----------|----------|----------|--------|--------|----------|---------|
|     | 1100000  | 00010    | rs1      | rm     | rd     | 1010011  | FCVT.L.S |
|     | 1100000  | 00011    | rs1      | rm     | rd     | 1010011  | FCVT.LU.S |
|     | 1101000  | 00010    | rs1      | rm     | rd     | 1010011  | FCVT.S.L |
|     | 1101000  | 00011    | rs1      | rm     | rd     | 1010011  | FCVT.S.LU |

RV32D standard extension

| Bit | 31    25 | 24    20 | 19  15 | 14  12 | 11      7 | 6        $b_1$ $b_0$ ↓↓ 1 | |
|---|---|---|---|---|---|---|---|
| | imm[11:0] | | rs1 | 011 | rd | 0000111 | FLD |
| | imm[11:5] | rs2 | rs1 | 011 | imm[4:0] | 0100111 | FSD |
| | rs3 | 01 | rs2 | rs1 | rm | rd | 1000011 | FMADD.D |
| | rs3 | 01 | rs2 | rs1 | rm | rd | 1000111 | FMSUB.D |
| | rs3 | 01 | rs2 | rs1 | rm | rd | 1001011 | FNMSUB.D |
| | rs3 | 01 | rs2 | rs1 | rm | rd | 1001111 | FNMADD.D |
| | 0000001 | rs2 | rs1 | rm | rd | 1010011 | FADD.D |
| | 0000101 | rs2 | rs1 | rm | rd | 1010011 | FSUB.D |
| | 0001001 | rs2 | rs1 | rm | rd | 1010011 | FMUL.D |
| | 0001101 | rs2 | rs1 | rm | rd | 1010011 | FDIV.D |
| | 0101101 | 00000 | rs1 | rm | rd | 1010011 | FSQRT.D |
| | 0010001 | rs2 | rs1 | 000 | rd | 1010011 | FSGNJ.D |
| | 0010001 | rs2 | rs1 | 001 | rd | 1010011 | FSGNJN.D |
| | 0010001 | rs2 | rs1 | 010 | rd | 1010011 | FSGNJX.D |
| | 0010101 | rs2 | rs1 | 000 | rd | 1010011 | FMIN.D |
| | 0010101 | rs2 | rs1 | 001 | rd | 1010011 | FMAX.D |
| | 0100000 | 00001 | rs1 | rm | rd | 1010011 | FCVT.S.D |
| | 0100001 | 00000 | rs1 | rm | rd | 1010011 | FCVT.D.S |
| | 1010001 | rs2 | rs1 | 010 | rd | 1010011 | FEQ.D |
| | 1010001 | rs2 | rs1 | 001 | rd | 1010011 | FLT.D |
| | 1010001 | rs2 | rs1 | 000 | rd | 1010011 | FLE.D |
| | 1110001 | 00000 | rs1 | 001 | rd | 1010011 | FCLASS.D |
| | 1100001 | 00000 | rs1 | rm | rd | 1010011 | FCVT.W.D |
| | 1100001 | 00001 | rs1 | rm | rd | 1010011 | FCVT.WU.D |
| | 1101001 | 00000 | rs1 | rm | rd | 1010011 | FCVT.D.W |
| | 1101001 | 00001 | rs1 | rm | rd | 1010011 | FCVT.D.WU |

Fig. 7a

RV64D standard extension (as an extension to RV32D)

| Bit | 31    25 | 24    20 | 19  15 | 14  12 | 11      7 | 6        $b_1$ $b_0$ ↓↓ 1 | |
|---|---|---|---|---|---|---|---|
| | 1100001 | 00010 | rs1 | rm | rd | 1010011 | FCVT.L.D |
| | 1100001 | 00011 | rs1 | rm | rd | 1010011 | FCVT.LU.D |
| | 1110001 | 00000 | rs1 | 000 | rd | 1010011 | FMV.X.D |
| | 1101001 | 00010 | rs1 | rm | rd | 1010011 | FCVT.D.L |
| | 1101001 | 00011 | rs1 | rm | rd | 1010011 | FCVT.D.LU |
| | 1111001 | 00000 | rs1 | 000 | rd | 1010011 | FMV.D.X |

Fig. 7b

DEVICE AND METHODS FOR PROCESSING BIT STRINGS

BACKGROUND

Program sequences are sometimes processed by means of microcontrollers using instruction sets. Such instruction sets can be based on an instruction set architecture, so that the architecture of instructions can be governed by certain rules. Program sequences can be monitored for their integrity and/or optimized.

There is therefore a need for a resource-efficient monitoring of target states of programs.

SUMMARY

According to one exemplary embodiment, a device for processing bit strings of a program flow comprises a data memory designed to provide a first bit string. The device also comprises an interface designed to output a second bit string. The device comprises a bit-string manipulator designed to analyze the first bit string at a predetermined bit string section for information indicating a target state of the program flow, and to manipulate the first bit string in the bit string section to obtain the second bit string.

According to one exemplary embodiment, a system comprises such a device.

According to a further exemplary embodiment, a device for providing a modified program flow comprises a first interface designed to receive a program flow that contains a plurality of bit strings. The device comprises a second interface, which is designed to output a second plurality of modified bit strings. The device comprises a bit string manipulator designed to manipulate at least one of the plurality of first bit strings at a predetermined bit string section to insert information indicating a target state of the program flow.

Other exemplary embodiments relate to methods for processing bit strings of a program flow, for providing a modified program flow, and to computer program products or non-volatile storage media directed towards these methods.

Further advantageous embodiments are the subject matter of dependent patent claims.

BRIEF DESCRIPTION OF THE DRAWINGS

In the following, preferred exemplary embodiments of the present disclosure are described in further detail by reference to the attached drawings. In the drawings:

FIG. 3b shows a schematic tabular representation of a RISC-V (RV) 64-bit basic instruction set (RV64I) according to an exemplary embodiment;

FIG. 4a shows a schematic tabular representation of instructions of the RV32M standard extension (multiply/divide) according to an exemplary embodiment;

FIG. 4b shows a schematic tabular representation of instructions of the RV64M standard extension in extension to RV32M according to an exemplary embodiment;

FIG. 5a shows a schematic tabular representation of instructions of the RV32A (Atomic) standard extension according to an exemplary embodiment;

FIG. 5b shows a schematic tabular representation of instructions of the RV64A standard extension as a supplement to the RV32A standard extension according to an exemplary embodiment;

FIG. 6a shows a schematic tabular representation of instructions of the RV32F (Single-Precision Floating-Point) standard extension according to an exemplary embodiment;

FIG. 6b shows a schematic tabular representation of instructions of the RV64F standard extension as a supplement to the RV32F standard extension according to an exemplary embodiment;

FIG. 7a shows a schematic tabular representation of instructions of an RV32D (Double-Precision Floating-point) standard extension, or its instructions, according to an exemplary embodiment;

FIG. 7b shows a schematic tabular representation of instructions of an RV64D standard extension compared with the RV32D standard extension according to an exemplary embodiment;

DETAILED DESCRIPTION

Before exemplary embodiments of the present disclosure are explained in detail below on the basis of the drawings, it is pointed out that identical, functionally identical or equivalent elements, objects and/or structures are provided with the same reference signs in the different figures, so that the description of these elements presented in different exemplary embodiments can be exchanged for or applied to one another.

Exemplary embodiments described in the following are described in connection with a large number of details. However, exemplary embodiments can also be implemented without these detailed features. In addition, for reasons of intelligibility, exemplary embodiments are described using block circuit diagrams as a substitute for a detailed representation. Furthermore, details and/or features of individual exemplary embodiments can be readily combined with one another unless explicitly stated to the contrary.

In some configurations, the exemplary embodiments described herein refer to the use and targeted modification of machine-readable instructions, wherein machine-readable is understood to include both hardware-processable and software-processable instructions as well as combinations thereof.

Some of the exemplary embodiments described here refer to instructions that are associated with an instruction set architecture (ISA). Some of the exemplary embodiments described herein are based on the design principle of the reduced instruction set computer (RISC), in particular the RISC-V ISA (ISA=instruction set architecture). However, it should be noted that this disclosure is not limited to the RISC-V instruction set architecture, but is also applicable to other instruction sets, in particular those in which the instruction sets or their bit strings have sections or regions in which at least some of the instructions have predefined bit values, for example, because the bits are unused or indicate the association to a specific section of the instruction set.

Figure 1:
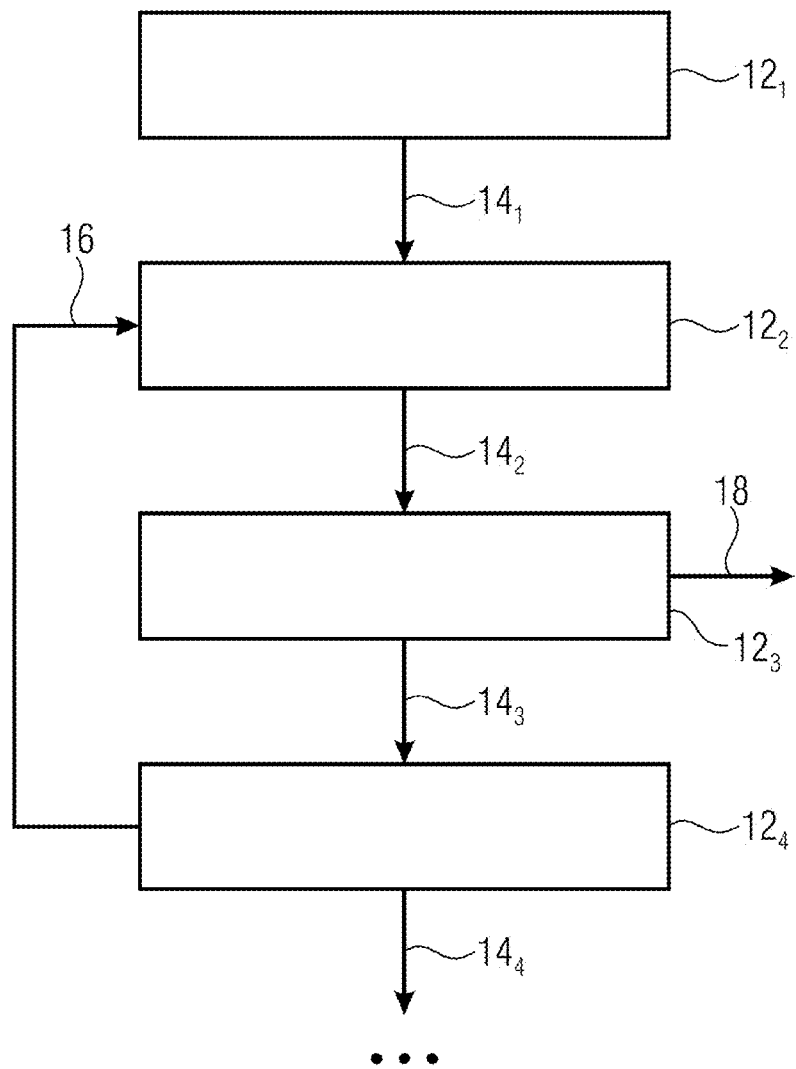
FIG. 1 shows a schematic block diagram to illustrate a program flow according to an exemplary embodiment.

FIG. 1 shows a schematic block diagram to illustrate a program flow 10. The program flow 10 is a greatly simplified representation for further explanation of the exemplary embodiments described herein and has, for example, four states $12_1$ to $12_4$ between which the program flow 10 can switch, wherein a program flow to be analyzed within the context of exemplary embodiments explained here can have a plurality of several 10 s of, several 100, or even several 1000 states. For example, sequential transitions $14_1$ to $14_4$ can be provided between the states, but returns 16 and/or at least one jump 18 to other states can also be provided. Alternatively, or in addition, branches can also be made, for example due to taking Yes/No decisions, greater than/less than comparisons or the like, so that a program flow 10 to be analyzed can be a highly complex structure.

Exemplary embodiments are aimed at evaluating such a program flow 10 in this respect, in particular at a target state of the program flow in the evaluation of a particular instruction. The target state can be understood as the state of a method or program that is obtained when an operation or instruction is executed. For example, a state can be understood as a state of a device or machine that is obtained on the basis of previously executed instructions, for example, by a non-restrictive and merely exemplary state being worded to the effect that: "The next fetched and executed instruction must have a jump target flag." The device can reach such a state, for example, by having previously carried out a jump instruction.

Figure 2:
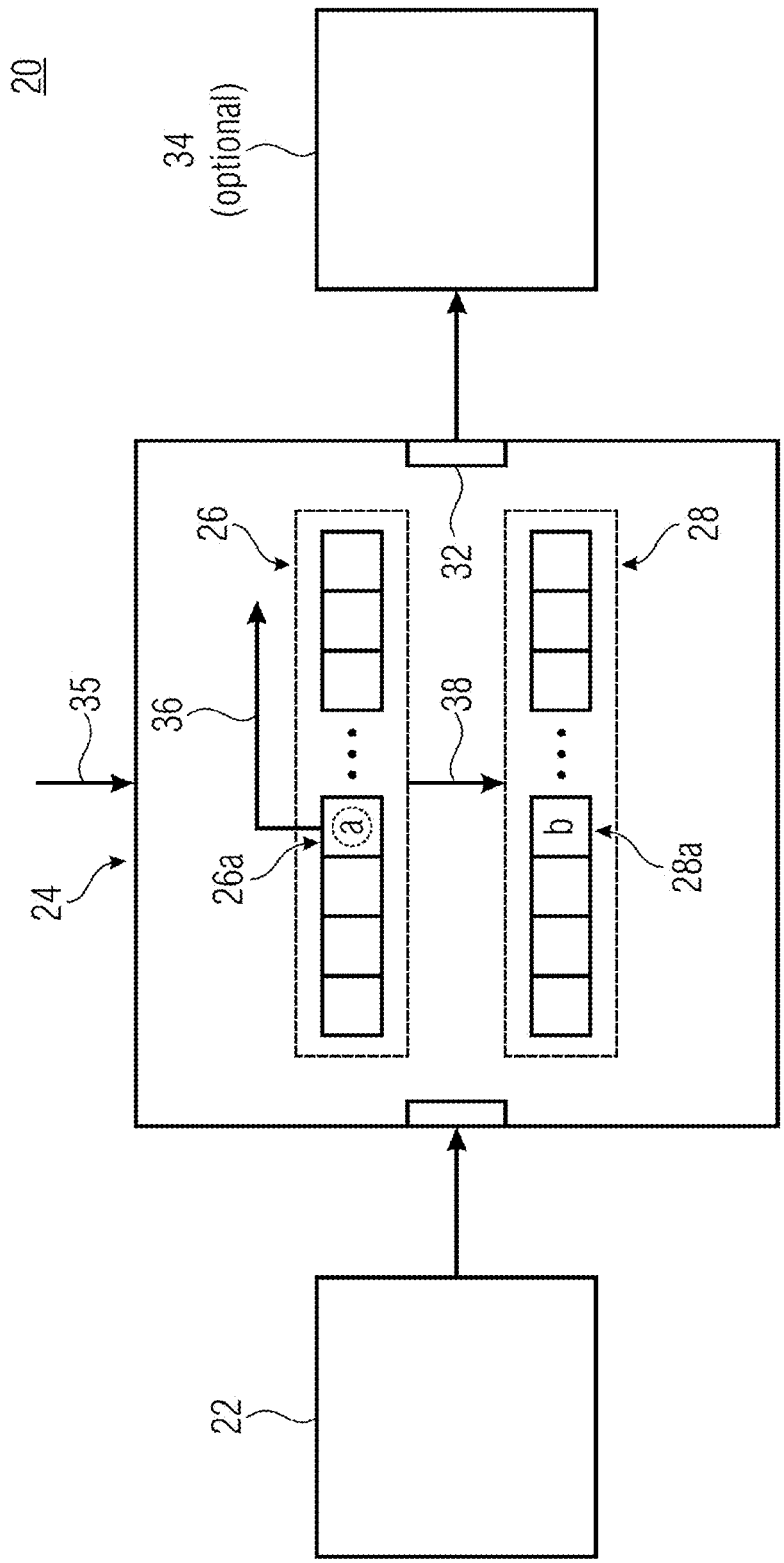
FIG. 2 shows a schematic block circuit diagram of a device according to an exemplary embodiment.

FIG. 2 shows a schematic block circuit diagram of a device 20 according to an exemplary embodiment. The device 20 comprises a data memory 22 in which a plurality of bit strings can be stored.

The device 20 comprises a bit string manipulator 24, which is designed to manipulate, i.e. to modify, a first bit string 26 into a second bit string 28. By means of the manipulation, the contents of the respective bit string can be selectively modified, i.e. manipulated, by, for example, changing bits or their information in a predefined way at predefined bit positions in a bit string of possibly constant length. While the first bit string 26 can be obtained from the data memory 22, the second bit string 28 can be output on an interface 32 of the device 20. The interface 32 can be configured to provide a data connection to a calculation device 34 using a wired, wireless and/or optical data connection, so that the calculation device 34 can process the second bit string 28 provided thereto. The calculation device 34, which according to exemplary embodiments may be part of the device 20 and/or of a system, comprises, for example, a processor, microcontroller, a field programmable gate array (FPGA), or any other device designed to process instructions or commands of an instruction set architecture, such as RISC-V.

The bit string manipulator 24 can be designed to analyze the first bit string 26 at a predetermined bit string section 26a for information 36 that indicates a target state of an executed program flow, such as the program flow 10, wherein the program flow 10 can be implemented by instructions that comprise the second bit string 28. The bit string manipulator 24 can be designed to manipulate and modify the first bit string 26 in the bit string section 26a, so that a modified information item can be stored in a bit string section 28a corresponding to the bit string section 26a, as indicated by the different letters a and b in the bit strings 26 and 28.

According to exemplary embodiments, the bit strings 26 and 28 are equal with respect to their bit length. This means that by means of a described manipulation 38 to change the bit string 26 into the bit string 28, a number of bits can remain unchanged but an information content of the bit string section 26a can be changed.

Bit string sections 26a and 28a can include one or more bits that can form a contiguous range in the bit string, i.e. in the instruction, but this is not essential. This means that the bit string section 26a can also be distributed within the bit string 26, a situation which can be alternatively or additionally described by stating that the first bit string 26 contains multiple bit string sections which can be analyzed for the information 36 and/or other information and which can be separated from one another in the first bit string 26 and the second bit string 28. The manipulated bit string sections 26a and 26b can be arranged at corresponding positions in the bit strings 26 and 28.

According to exemplary embodiments, the bit string manipulator is designed to provide and/or generate the second bit string 28 in such a way that it comprises a valid instruction of a predefined instruction set of its program flow. In other words, the second bit string 28 can be an instruction of the instruction set architecture that can be processed by the calculation device 34.

Since the first bit string 26 is modified compared to the second bit string 28, the first bit string can deviate from a predefined instruction set of the program flow. This may mean, for example, that the bit string 26 would be processed incorrectly or cannot be processed by the calculation device 34.

According to exemplary embodiments, the manipulation 38 in order to obtain the bit string 28 may therefore be necessary to enable error-free or at least error-compensated execution of the bit string and thus, for example, of the instruction read from the memory, in the calculation device 34.

However, the information 36 can provide statements that allow the evaluation of the program flow integrity, which means that the bit string manipulator 24 can be designed to verify the integrity of the program flow based on the information 36. This can be achieved, for example, by storing the bit string 26 as part of an encoding, compilation or the like on the basis of the actual bit string, such as the bit string 28. As explained in detail below, this can be accomplished by considering specific rules so that the bit-string manipulator 24 has information both about the position in the first bit string 26 at which the bit-string section 26a is stored and also the form in which it must execute the manipulation 38. This predefined set of rules allows the bit string manipulator 24 to recreate the original instruction 28 without changing the information of the instruction expressed by the second bit string 28.

The bit-string manipulator 24 can be designed, using the information, to verify a program flow based on a plurality of received bit strings and/or to verify the reliability of a program flow instruction contained in the second bit string 28. For this purpose, for example, the information 36 can be used, which can contain information about which instructions preceded or will follow the second bit string 28, whether a specified jump target in the second bit string 28 is valid and/or whether there is a match or discrepancy between valid instructions or program sequences or instruction flows.

According to exemplary embodiments, any items of information can be stored in bit string section 26a, in particular those that indicate a target state of the program flow in whatever form.

Figure 3A:
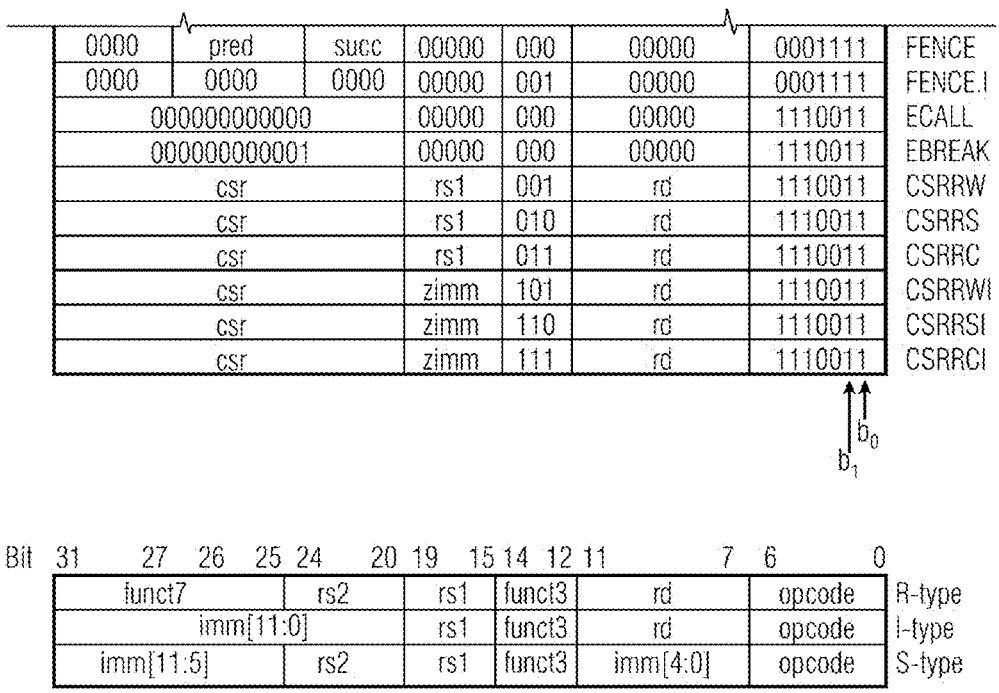
FIG. 3a shows a schematic tabular representation of a RISC-V (RV) 32-bit basic instruction set (RV32I) according to an exemplary embodiment.

FIG. 3a shows a schematic tabular representation of a RISC-V (RV) 32-bit basic instruction set (RV32I). RISC-V is an instruction-set architecture originally developed to support research and education in the field of computer architecture, but which is also emerging as a free and open standard architecture for industrial implementations. RISC-V can include a fully open ISA that is freely available to the academic community and industry. Alternatively or additionally, RISC-V includes an ISA that is suitable for a direct native hardware implementation, not just for simulation or binary translation.

RISC-V comprises a small basic instruction set (base integer ISA) that can form a suitable basis for customer-specific accelerators and optional standard extensions to support general software development. For example, two primary base integer variants, RV32I and RV64I, can be available that provide 32-bit or 64-bit instructions respectively.

Due to their very regular structure, RISC-V opcodes (short for operation code) are on the one hand easy to decode, but on the other are also susceptible to targeted failure attacks, for example to a specific modification of instruction types or operand register addresses. Exemplary embodiments are aimed at refining this property by monitoring the target state of the program.

While known techniques are directed towards improving the integrity of, for example, microcontrollers on hardware components such as arithmetic logic units (ALU), counters and finite state machines that are implemented redundantly, opcodes that form code words of a linear code, checksums of the executed commands that are calculated and regularly verified and/or towards the introduction of specific commands to mark targets of jump commands, exemplary embodiments are aimed at the use of unused information and thus bits in stored bit sequences at a given time for other, more useful purposes, which can also be referred to as 're-purposing'. This allows integrity to be strengthened even without the known actions outlined above, which can be accompanied by changes in the hardware design of the microcontroller. Even if such measures are not excluded, exemplary embodiments can also be implemented independently of them. This can also reduce the complexity of adapting so-called "toolchains" for development and debugging (error elimination) to the new mechanisms or even make it redundant, which is an advantage.

To increase the code density of applications, RISC-V offers an optional extension that implements a compressed instruction set. The least significant bits $B_0$ and $B_1$ of an opcode distinguish between so-called "sectors" that are used to implement the compressed instruction set. For example, uncompressed instructions of the specified base integer variants (RV32I, RV64I) and their various extension sets (MAFDQ—multiply/divide, atomic, single-precision floating-point, double-precision floating-point and quadruple-precision floating-point) may have the property that the lowest bits $b_0$ and $b_1$ are always set to 1.

On this point, reference is made to FIGS. 3a to 7b. While FIG. 3a shows a schematic tabular representation of the RV32I basic instruction set, FIG. 3b shows the RV64I basic instruction set (or the extension relative to the RV32 basic instruction set).

FIG. 4a shows a schematic tabular representation of the RV32M standard extension (multiply/divide).

FIG. 4b shows a schematic tabular representation of the RV64M standard extension as an extension to RV32M.

FIG. 5a shows a schematic tabular representation of the RV32A (atomic) standard extension.

FIG. 5b shows a schematic tabular representation of the instructions of the RV64A standard extension as a supplement to the RV32A standard extension.

FIG. 6a shows a schematic tabular representation of instructions of the RV32F (single-precision floating-point) standard extension.

FIG. 6b shows a schematic, tabular representation of instructions of the RV64F standard extension as an extension to the RV32F standard extension.

FIG. 7a shows a schematic, tabular representation of an RV32D (double-precision floating-point) standard extension, or its instructions.

FIG. 7b shows a schematic tabular representation of instructions of an RV64D standard extension compared to the RV32D standard extension.

It can be seen that bits $b_0$ and $b_1$ always have the value 1 both in the basic instructions and the extensions. This knowledge can be used to selectively modify information at this point during encoding or compilation, by using information that describes the target state of the program sequence and can be used, for example, to monitor the integrity of the program flow. In other words, these bits can be essentially unused for the encoding of uncompressed opcodes and can be available as substitute bits for implementing additional integrity protection measures.

Alternatively or additionally, other parts of opcodes can be used in which multiple bits are unchanged for all instructions in the respective subset. These bits can also be used for implementing integrity protection measures and/or for other purposes. For example, an example of such a subset could be the instructions for arithmetic, logical, and load/memory operations, such as the instructions LB, LH, LW, LBU, LHU, SB, SH, SW, ADDI, SLTI, SLTIU, XORI, ORI, ANDI, SLLI, SRLI, SRAI, ADD, SUB, SLL, SLT, SLTU, XOR, SRL, SRA, OR and/or AND, which can form a subset 42 of the RV32I basic instruction set, for example.

In the example subset 42, for example, bits $b_2$, $b_3$ and $b_6$ of the bits $b_0 \ldots b_6$ of the opcodes have the value 0. In other words, the subset can be formed or chosen based on a subset of available instructions at matching bit positions having a fixed bit value.

The subset 42 can also be extended with M instructions for multiplication and division operations, see also FIG. 4a or the RV32M extension set M, for example. For other instructions, such as the 64-bit variants according to FIG. 4b for example, as an alternative, bit $b_2$ and bit $b_6$ can still have the value 0. For smaller subsets of the given instructions, which means for a smaller number of instructions contained in a subset, a higher number of bits can be fixed. If instructions can be identified as elements of such a subset, as provided for in the exemplary embodiments described herein, the bits at the fixed bit positions are available for implementing integrity protection measures. For example, for such an identification, a portion of the bit string section could be used to indicate that the first bit string 26 is modified relative to the instruction of the bit string 28 and that additional information is contained in the bit string section 26a.

The bit string section 26a can be arranged in a section of the bit string 26 which disallows constant bits via different instructions of the program flow, at least within one section of the program flow. Alternatively or additionally, the device 20 can be designed to obtain a first bit string 26 and manipulate it into a corresponding second bit string 28 repeatedly, in a plurality of repetitions. Manipulation is understood to mean a modification of the bit string by changing individual bit values. One position of the bit string section can be constant in different repetitions, for example, for different instructions of the program flow. As a result, a hardware-implemented configuration of the bit string manipulator can be obtained in a particularly advantageous way, which enables a fast implementation of the bit string manipulation. Alternatively or additionally, it is possible to transmit a first bit string 26 to the device 20 or to the bit string manipulator 24 repeatedly, in a plurality of repetitions, and manipulate it into a second bit string. A position of the bit string section 26a can vary in different repetitions, for example the object of bit strings 28 in the instructions of different subsets 42. Appropriate knowledge can be used to modify the analyzed bit string sections.

According to an exemplary embodiment, the bit string manipulator 24 can be designed to derive a control command from the information 36 and to output the control command. For example, the control command can be an instruction to a system that contains the bit-string manipulator and/or to an external device. The control command can be output, for example, based on whether the evaluation by the bit string manipulator 24 indicates that the target state of the program flow is valid or a deviation from a predetermined target state has been detected, i.e., the target state is invalid or contains errors. The control command may be directed towards activating or deactivating one or more properties, subsystems or functions of the device or the associated system. For example, an activation or deactivation of a part of a peripheral of the device or of a system connected to the device can be instructed or indicated by means of the control command. Alternatively or additionally, an activation or deactivation of a memory range of a data memory can be instructed or indicated. Alternatively or additionally, for example, an activation or deactivation of a functionality of at least a part of a calculation device can be indicated or instructed, for example of a core of the calculation device 34. This can also be understood as the initiation of security measures or the active enabling of functions based on the monitoring of the program flow.

According to exemplary embodiments, the device 20 is designed to use the information 36 as redundancy information associated with the second bit string 28, which means at least parts of the information 36 can be used as redundancy information.

According to one exemplary embodiment, the device 20 is designed to use the information 36 as having at least one parity bit for the first bit string 26 or the second bit string 28.

According to one exemplary embodiment, the device 20 is designed to use the information 36 for an error-detecting or error-correcting code for the first bit string 26 and/or the second bit string 28.

According to one exemplary embodiment, the device 20 is designed to use the information 36 for verifying a status of a device receiving the second bit string 28, for example the calculation device 34 and/or an overall system. This means that the additional bits of the bit string 26a can be used for processor status information to indicate a potentially targeted state of a processor.

Figure 8:
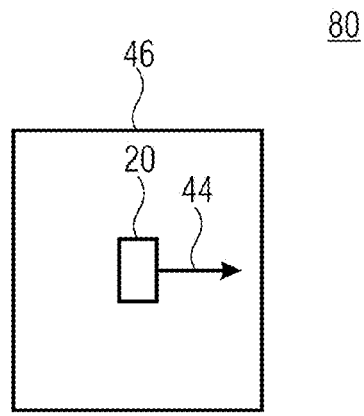
FIG. 8 shows a schematic block diagram of a system according to an exemplary embodiment.

FIG. 8 shows a schematic block diagram of a system 80 according to one exemplary embodiment, which comprises the device 20. The device 20 can be designed to output a signal 44 that contains an instruction to a device 46 of the system 80 to respond to an incorrect program flow.

According to an exemplary embodiment, the device 20 is designed to analyze the information 36 to determine whether a state displayed in the information 36 corresponds to the target state in order to obtain a verification result assigned to the program flow. In other words, it is possible to evaluate whether the target state matches an intended target state. The verification result can indicate whether there is a match and/or a discrepancy. Based on the verification result, the device can output a signal that contains an instruction to a device receiving the signal to respond to an incorrect program flow.

This means that the state indicated in the information 36 can be compared to a target state and/or a value contained in the bit string section 26a can be checked for a match with a predefined value to obtain a corresponding verification result. The signal 44 can be used to indicate to the device 46 that a response is required.

It can make no difference whether the 44 signal is an active signal with a request to execute an active action or the signal 44 is no longer issued in order to indicate an incorrect state, i.e. a continuous or periodic transmission is suspended, so that the absence of the signal 44 is interpreted as an error state.

For example, the bit-string manipulator 24 can be formed as a monitoring device, such as a watchdog, which is designed to monitor the program flow based on the analyzed information 36. Alternatively or additionally, the bit string manipulator 24 can be designed to obtain state information associated with the information 36, for example from the data memory 22 and/or from the calculation device 34, which indicates the state of the program flow. The bit string manipulator can be designed to compare the target state of the program flow with the state of the program flow. For example, the information 36 can link to a table with further information for actions and the like. This means that the state information can provide a different representation of the information 36. This state information can take into account, for example, which instructions have already been executed and thus provide a kind of memory. For example, the information 36 from a plurality of bit strings 26 taken together can trigger an action. This means that the state information can be combinatorial information based on a multiplicity of first bit strings 26 and/or second bit strings 28.

An appropriate response may be, for example, a reset of the program flow, but an action may also be derived, according to which the device 46 and/or the system 80 is transferred to a safe state, for example, by protecting memory areas from read and/or write accesses, by the system 80, implemented as a vehicle for example, being decelerated, or any other type of action.

According to one exemplary embodiment, the bit string manipulator 24 is designed to generate the second bit string 28 in accordance with a standard-based set of instructions, for example a RISC-V-ISA, and to obtain the first bit string 26 as a bit string which is arranged at a predetermined location where a plurality of instructions of at least a part of the standard-based set of instructions, such as the subset 42, have constant bit values, the bit string section being arranged at least partially at the predetermined location.

According to exemplary embodiments, the state of the program flow and/or the target state of the program flow specifies a jump target of an instruction, as is described for example for the jump operation 18 in FIG. 1. Such a jump operation can be specified in the bit string 28. For example, the bit string manipulator 24 can be designed to analyze the information 36 to determine which of the states is expected for the subsequent instruction. This may include expecting no target, expecting a linear target, such as can be obtained by means of the transition 14, a jump target as obtained by means of the transition 18, or a combination of these, that is, a linear target and a jump target are expected. These four states can be represented particularly well by using two bits, such as the bits $b_0$ and $b_1$ of FIGS. 3a to 7b.

According to one exemplary embodiment, the bit string manipulator 24 is designed to analyze the information 36 for at least two partial items of information. The partial information items may comprise, for example, parity information of the second bit string 28, indicate a current or subsequent section of the program flow, indicate a state of a calculation device such as the calculation device 34, and indicate a state of the device or a system comprising the device. The bit string manipulator can analyze the information 36 for only one, but according to one exemplary embodiment, two or more, of these information items. This means that a plurality of partial information items can be stored in the bits that have become free.

The bit string manipulator 24 can comprise a hardware-implemented electronic circuit that is designed to modify bit values of the bit string section 26a by means of an interconnection or hard-wiring in the electronic circuit. For example, by means of such an interconnection, specific values for manipulating the bit string to a specific value can be hard-wired, for example 1 for bits $b_0$ and $b_1$.

Alternatively or in addition, the bit string manipulator 24 can be implemented at least partially in software.

Figure 9:
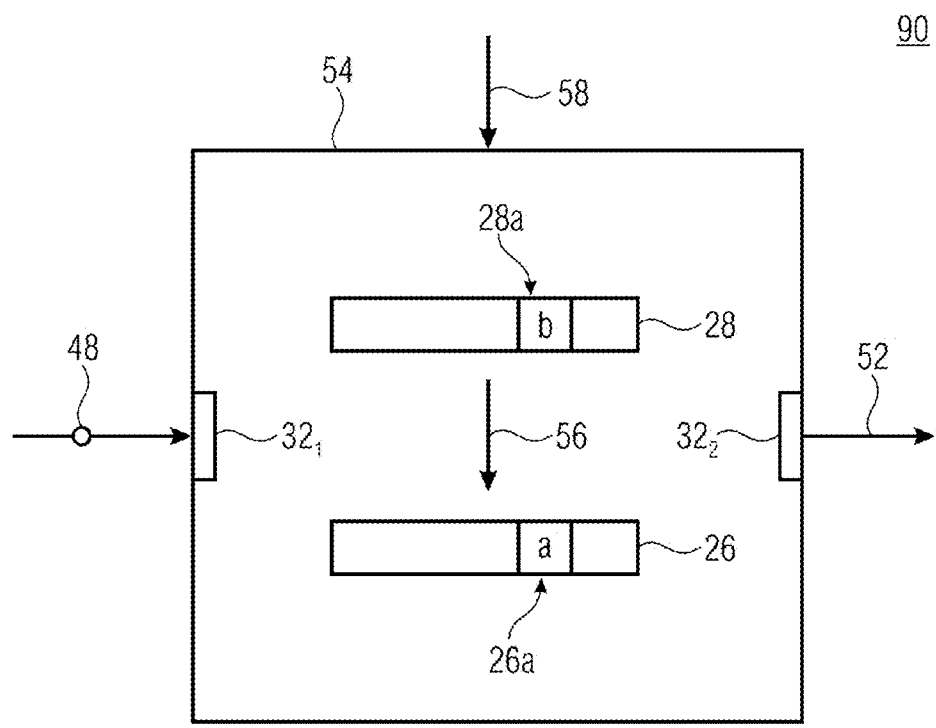
FIG. 9 shows a schematic block circuit diagram of a device for providing a modified program flow according to an exemplary embodiment.

FIG. 9 shows a schematic block circuit diagram of a device 90 for providing a modified program flow. The device comprises an interface $32_1$ which is designed to receive a program flow 48 which, for example, fully or partially matches the program flow 10 and which has a plurality of bit strings 28. This means that the program flow 48 can have a plurality of instructions, each implemented as a bit string 28. The device 90 also comprises an interface $32_2$ which is designed to output a plurality 52 of bit strings 26. The device 90 comprises a bit-string manipulator 54, which can be formed as the inverse of the bit-string manipulator 24, for example, and which is designed to manipulate at least one of the plurality of bit strings 28 at a predetermined bit string section 28a, for example by means of a manipulation 56, to insert into the bit string 28 information that indicates a target state of the program flow. This is preferably carried out at a position of the bit string 28 at which the content of the bit string 28 is known in advance even during a later use of the bit string 26, as is described in connection with FIG. 2, for example.

State information about the program flow 58, which can be obtained during the modification or compilation of the program, can be used as a basis for the manipulation 56 so that corresponding information can be used later when transforming the manipulated instruction back, for example by means of the bit string manipulator 24, to evaluate the program state, for example as information 36.

In other words, for example, a small circuit, the bit-string manipulator 24, can be added to a RISC-V processor core with separate bus interfaces for instructions and data of the instruction-fetch interface. For example, this circuit verifies the integrity of the instructions read from the memory, where redundancy information can be stored in the bits at the positions of the fixed bits of the opcodes. If this test fails, a security alarm can be triggered, for example by means of the signal 44. Otherwise, the bits at the fixed positions of the fixed bits can be set to their correct expected value and the resulting command word can be fed to the CPU, for example to the calculation device 34, for execution.

In one possible design, this protection mechanism is stateless and implements a linear code of the data word read from the data memory during the instruction fetch. It is also possible that the circuit maintains state information and that the integrity check of the data word depends, for example, on previously executed instructions, such as jump instructions, as explained based on the memory.

An approach followed in some exemplary embodiments provides the advantage that integrity protection mechanisms can be added to an existing CPU core, such as a licensed IP core, without the need to adapt the CPU hardware for the purpose. In addition, existing toolchains for software development and debugging can be used without modification, because the binary representation generated can be extended at fixed bit positions with the information for the bits. If additional sideband signals with information about internal CPU states are available, more complex and/or protection mechanisms are possible, even if the implementation of the CPU or the calculation device for generating the sideband signals can be modified for this purpose.

One exemplary embodiment uses a RISC-V CPU without a compressed instruction set. This allows two bits $b_0$ and $b_1$ of the opcodes, which are normally set to 1, to be used to store redundancy information of a code, for example, a bitwise parity of the other 30 data bits, $b_{31} \ldots b_3 b_2$ of the opcode. This results in a code with a minimum distance of 2, which can detect a single error in data words read from the memory. In a variant of this, the data bits are divided into two possibly disjunct subsets so that, for example, bits $b_0$ and $b_1$ can store parity information of the respective subsets. This can improve the error detection capability of the code. In another variant, a residual class code can be used. For example, bits $b_0$ and $b_1$ can perform an operation on the value of the remaining 30-bit integer $(b_{31} \ldots b_3 b_2)$ and store the result, such as the data value of these 30 bits modulo 3 or another operation. Embodiments therefore refer to the fact that the bit string section 26a has a plurality of bits that contain redundancy information for the entire remainder of the instruction and/or that a first partial bit string section contains redundancy information for a first part or subset of the remainder of the instruction, and another, disjunct partial bit string section contains redundancy information for another part of the instruction. In other variants, the bit string section can affect the entire remainder of the instruction, for example, the integer value modulo 3 or any other suitable modulo value, or another suitable operation.

According to an exemplary embodiment, a variant of the encoding scheme can be used, for example, to use one bit, such as bits $b_0$ or $b_1$, as a flag that the opcode belongs to an element of a first subset with a larger set of fixed bits. When the flag is set, all bits at fixed bit positions of the opcodes of the subset are used to store redundancy information. The circuit at the code-fetch interface, the bit-string manipulator, can verify the code properties for words read from memory when the flag bit is set. Such an exemplary embodiment can be combined with the exemplary embodiment that a bit additionally stores the parity information of the word read from the memory. The advantage of using subsets of opcodes with a greater number of fixed bits is that better codes with higher minimum distance and better error detection capabilities can be used, at least for the opcodes in the subset.

According to one exemplary embodiment, the fixed bits of the opcodes can be used to protect the control flow of the program execution. This can be accomplished essentially by storing processor state information in the bits at the fixed bit positions. A bit at a fixed bit position can be used, for example, to flag jump target addresses, function entry points or return jump points. In RISC-V, subroutine calls and return jumps, for example by so-called pseudo-instructions CALL and/or RET, are implemented by JAL and JALR jump instructions. The circuit at the code-fetch interface, the bit-string manipulator 24, can easily recognize JAL and JALR jump instructions (pattern 110*111) at bit positions $b_0 \ldots b_1 b_0$, where * means any value, and store this information. For example, if the last instruction executed was a JAL or JALR jump instruction, the next opcode retrieved can be read from a jump target address and can be flagged in the bit at the fixed bit position. The verification circuit can check whether the flag is set at the fixed bit position of the next instruction read from the memory. Otherwise, if no jump instruction has been loaded from the memory, the flag of the next instruction retrieved must not be set. All other cases can lead to a security alarm, which can be indicated by means of the signal 44, for example. It can be noted that this procedure can also protect RET return instructions. For example, flagging instructions at jump target addresses in the code can prevent or at least complicate attacks based on return-jump oriented programming. In a variant of this disclosure, the CPU can implement a sideband signal that is set when the last instruction executed was a JAL or JALR jump instruction. Such information can be received by the bit string manipulator 24, for example by means of a signal 35, which may be provided by the calculation device 34.

Such a protection mechanism can be combined with the linear code described above. For example, bit $b_0$ can be used to store and check parity information of the opcode, while bit $b_1$ can be used to flag and check jump target addresses of JAL and JALR jump instructions. The position of the bits can also be reversed.

In a variant of the exemplary embodiment, a fixed bit can be used to flag opcodes at jump target addresses of the conditional jumps BEQ, BNE, BLT, BGE, BLTU and BGEU. For example, a conditional jump instruction can have the pattern 1100011 at the bit positions $b_6 \ldots b_1 b_0$. In a variant, the CPU can implement a sideband signal 35 which can be set if the last executed instruction was a conditional jump instruction. Different bits can be used to flag conditional jumps and JAL and JALR jump instructions. Alternatively, all jump instructions can be flagged with a single bit position, such as 110**11 at bit positions $b_6 \ldots b_1 b_0$, where * is any bit value.

In a variant, the distinction between the execution of jumps and the execution of linear code can be made by observing the instruction fetch addresses. For example, if the address of the next instruction fetched increases by 4, where 4 data words can correspond to a 32-bit instruction, then a linear code segment can be executed. Otherwise, for example, a jump instruction is executed.

In a variant of the exemplary embodiments described herein, the bits $b_1$ and $b_0$ can be used to flag no instructions, instructions for linear code segment, instructions for jump target addresses, and instructions that can be reached by linear code execution of jump instructions. For this purpose, different encodings can be used for the bits $b_1$ and $b_0$, for example $(b_1, b_0)=\{00, 01, 10, 11\}$. These values can be represented, for example, according to the rule that 00=no target
01=linear target
10=jump target
11=linear and jump target.

A verification circuit or watchdog can be implemented that verifies that the control flow corresponds to this coding.

In one configuration of exemplary embodiments described here, the fixed bits of the opcodes can be used to encode processor modes. The bits $b_0$ and $b_1$ can encode, for example, whether an opcode should be run in user mode or kernel mode, or whether that part of the code implements an interrupt service program (for example $b_0=0$ for user mode code, $b_0=1$ for kernel mode code; a check of whether the bit $b_0$ of the fetched instruction matches the actual mode can be implemented in hardware. If the mode and bits are different, an alarm can be triggered, for example). This integrity protection measure can be implemented using additional sideband signals 35 to evaluate the actual state of the CPU modes.

In one configuration of existing exemplary embodiments, a coloring of the control flow graph or the fetch graph can be checked. For example, if bits $b_0$ and $b_1$ are used, the value of the bits can represent four colors of the executed instructions, which can be automatically checked against an expected CPU state. The CPU state information can be switched over using various mechanisms: a function call or function return (JAL, JALR) can change to the next or previous color, for example. Dummy function calls can be inserted to select the required colors if additional transition steps are required. In a variant of the exemplary embodiments described here, a specific instruction from an extended instruction set, see FIGS. 3a to 7b, or a CSR instruction from the base instruction set is used to set the expected colors in the CPU.

Different combinations of the described exemplary embodiments and mechanisms are possible. For example, bit $b_0$ can encode the parity information of the data word and bit $b_1$ can flag jump targets or CPU modes, such as kernel and user mode.

Exemplary embodiments can provide protection mechanisms that are independent of the given implementation of the RISC-V CPU core. These can be applied to an existing system to increase resilience against failure attacks. This can be done by making minor changes to the instruction-fetch bus interface, which can involve only low hardware costs.

Exemplary embodiments can be at least partly based on the observation that the standard-based RISC-V instruction set and other instruction sets that have properties that bits of the respective opcodes have fixed values for large subsets of instructions. This may be due, for example, to the design requirement that the instruction set be simple and fast to decode. For example, bits $b_0$ and $b_1$ for all uncompressed instructions are set to 1 when considering the RISC-V instruction set. The fixed bits do not carry any useful information and their values can be changed for the actual instruction values stored in memory. The exemplary embodiments and mechanisms described use these bits to implement various protection mechanisms to improve the integrity of the program code and/or control flow. Simple transformations of the uncompressed instruction set can be used to strengthen the integrity of the RISC-V opcode and program flow. Most of the described measures can be implemented on existing RISC-V IP cores without changing the design of the CPUs. In addition, existing toolchains for software development and debugging can still be used.

Figure 10:
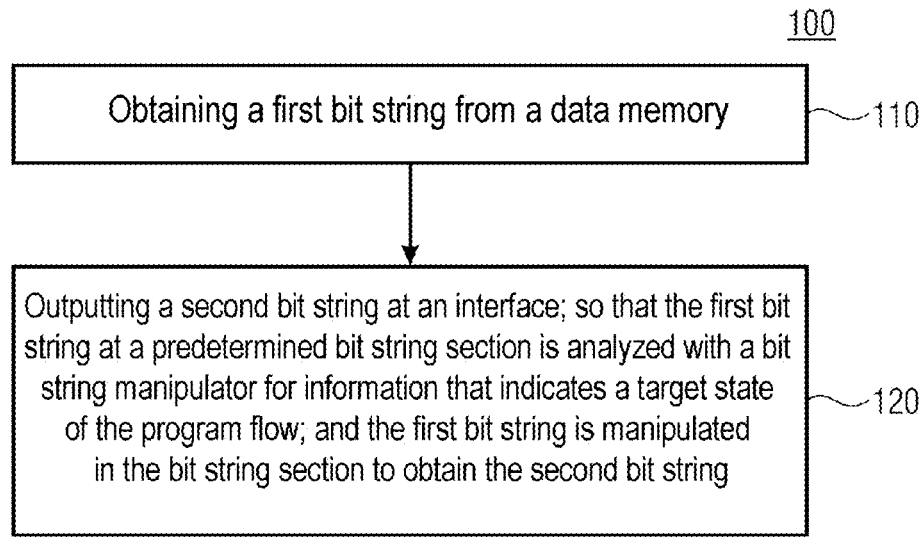
FIG. 10 shows a schematic flowchart of a method for evaluating a target state of a program according to an exemplary embodiment.

FIG. 10 shows a schematic flowchart of a method 100 according to an exemplary embodiment. A step 110 comprises obtaining a first bit string from a data memory. A step 120 comprises outputting a second bit string at an interface so that the first bit string at a predetermined bit string section is analyzed with a bit string manipulator for information that indicates a target state of the program flow. The first bit string is manipulated in the bit string section to obtain the second bit string that can be output.

Figure 11:
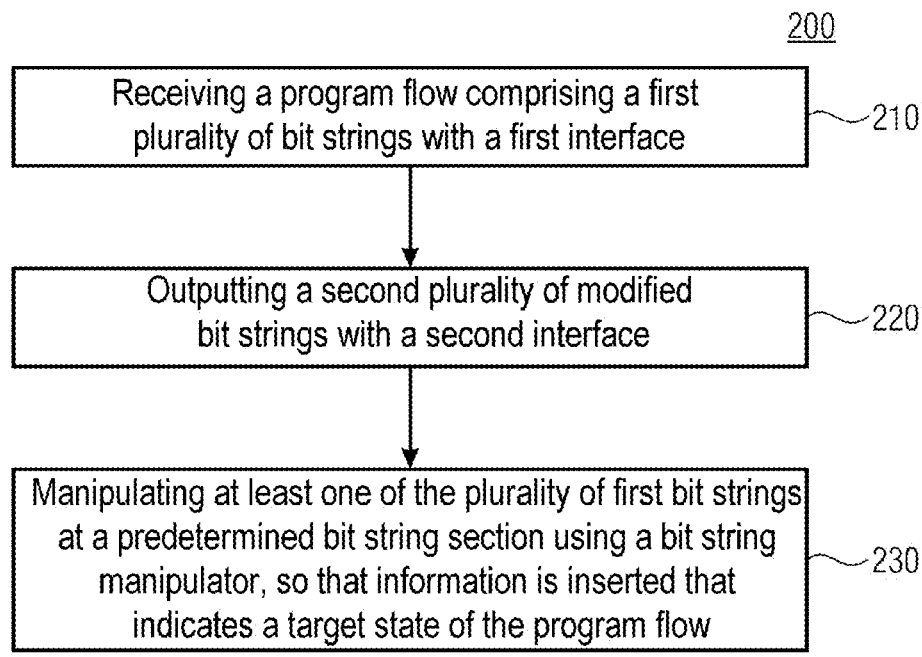
FIG. 11 shows a schematic flowchart of a method for obtaining modified instructions according to an exemplary embodiment.

FIG. 11 shows a schematic flowchart of a method 200 according to an exemplary embodiment. A step 210 comprises receiving a program flow comprising a first plurality of bit strings with a first interface. A step 220 comprises outputting a second plurality of modified bit strings with a second interface. A step 230 comprises manipulating at least one of the plurality of first bit strings at a predetermined bit string section using a bit string manipulator, such that information is inserted that indicates a target state of the program flow. Step 230 can be performed before step 220 or at the same time.

Although some aspects have been described in connection with a device, it goes without saying that these aspects also represent a description of the corresponding method, so that a block or a component of a device is also to be understood as a corresponding method step or as a feature of a method step. Similarly, aspects that have been described in relation to or as a method step also represent a description of a corresponding block or detail or feature of a corresponding device.

Depending on the specific implementation requirements, exemplary embodiments of the disclosure can be implemented either in hardware or in software. The implementation can be carried out by using a digital storage medium, such as a floppy disk, a DVD, a Blu-Ray disc, a CD, a ROM, a PROM, an EPROM, an EEPROM or a Flash memory, a hard disk or other magnetic or optical storage medium, on which electronically readable control signals are stored which can interact or do interact with a programmable computer system in such a way that the respective method is carried out. Therefore, the digital storage medium can be computer-readable. Some exemplary embodiments according to the disclosure thus comprise a data carrier, which has electronically readable control signals that are capable of interacting with a programmable computer system in such a way that one of the methods described herein is carried out.

In general, exemplary embodiments of the present disclosure may be implemented as a computer program product with a program code, wherein the effect of the program code is to carry out one of the methods when the computer program product is executed on a computer. For example, the program code can also be stored on a machine-readable medium.

Other exemplary embodiments comprise the computer program for carrying out any of the methods described herein, the computer program being stored on a machine-readable medium.

In other words, one exemplary embodiment of the described methods is therefore a computer program that has program code for carrying out one of the methods described herein when the computer program is executed on a computer. Another exemplary embodiment of the described methods is therefore a data carrier (or a digital storage medium or a computer-readable medium), on which the program for carrying out one of the methods described herein is recorded.

Another exemplary embodiment of the described method is therefore a data stream or a sequence of signals which represent or represents the program for carrying out one of the methods described herein. The data stream or the sequence of signals can be configured, for example, so as to be transferred over a data communication connection, for example via the internet.

Another exemplary embodiment comprises a processing device, such as a computer or a programmable logic device, which is configured or adapted to carry out any of the methods described herein.

Another exemplary embodiment comprises a computer on which the computer program for carrying out any of the methods described herein is installed.

In some exemplary embodiments, a programmable logic device (such as a field programmable gate array, an FPGA) can be used to perform some or all of the functions of the methods described herein. In some exemplary embodiments, a field-programmable gate array can interact with a microprocessor to carry out any of the methods described herein. In general, the methods in some exemplary embodiments are carried out by any hardware device. This can be a universally applicable hardware such as a computer processor (CPU) or hardware specific to the method, such as an ASIC.

The examples described above only represent an illustration of the principles of the present disclosure. It is implicit that modifications and variations of the arrangements and details described herein will be apparent other persons skilled in the art. It is therefore intended that the exemplary embodiments be limited only by the scope of protection of the following patent claims and not by the specific details, which have been presented herein on the basis of the description and explanation of the exemplary embodiments.

The invention claimed is:

1. A device for processing bit strings of a program flow, comprising:
    a data memory designed to store a first bit string;
    bit string manipulator circuitry designed to:
        access the data memory to obtain the first bit string from the data memory and store in a second memory;
        access the second memory to verify during processing an integrity of the first bit string at a predetermined bit string section of the first bit string having information indicating a target state of the program flow; and
        if the verification indicates that the first bit string deviates from a predefined instruction set of the program flow, access the second memory to manipulate the first bit string in the bit string section to obtain a second bit string, wherein the second bit string comprises, in the bit string section, a valid instruction such that the second bit string corresponds to the predefined instruction set of the program flow for error-compensated processing; and
    an interface designed to output a signal having the second bit string.

2. The device as claimed in claim 1, wherein the bit string manipulator circuitry is designed to use the information to verify a program flow based on a plurality of received bit strings, and/or
    wherein the bit string manipulator circuitry is designed to verify an admissibility of an instruction of the program flow contained in the second bit string.

3. The device as claimed in claim 1, wherein the bit string manipulator circuitry is designed to derive a control command from the information, and to output the control command.

4. The device as claimed in claim 3, wherein the control command relates to:
    an activation or deactivation of a part of a peripheral of the device or of a system connected to the device;
    an activation or deactivation of a memory range of a data memory; or an activation or deactivation of a functionality of at least one part of a calculation device.

5. The device as claimed in claim 1, wherein the information has at least one parity bit for the first bit string or the second bit string.

6. The device as claimed in claim 1, wherein the information is an error-detecting or error-correcting code for the first bit string and/or the second bit string.

7. The device as claimed in claim 1, wherein the information is verifying information for verifying a status of a device receiving the second bit string.

8. The device as claimed in claim 1, wherein the device is designed to analyze the information to determine whether a status indicated in the information matches the target state in order to obtain a verification result assigned to the program flow and, based on the verification result, to output a signal that contains an instruction to a device receiving the signal to react to an incorrect program flow.

9. The device as claimed in claim 1, wherein the bit string section is arranged in a section of the first bit string that has constant bits over different instructions within a section of the program flow.

10. The device as claimed in claim 1, wherein the device is designed to obtain a first bit string repeatedly in a plurality of repetitions and to change the first bit string into a second bit string, and wherein a position of the bit string section in different repetitions is predefined.

11. The device as claimed in claim 1, wherein the bit string manipulator circuitry is designed to generate the second bit string in accordance with a standard-based set of instructions, and to obtain the first bit string as a bit string which is arranged at a predetermined location where a plurality of instructions of at least a part of the standard-based set of instructions have constant bit values, the bit string section being arranged at least partially at the predetermined location.

12. The device as claimed in claim 11, wherein the standard-based set of instructions is a RISC-V instruction set.

13. The device as claimed in claim 1, wherein the bit string manipulator circuitry is designed to obtain state information, which is associated with the information and indicates the state of the program flow, and to compare the target state of the program flow with the state of the program flow.

14. The device as claimed in claim 1, wherein the state of the program flow and/or the target state of the program flow specifies a jump target of an instruction specified in the second bit string.

15. The device as claimed in claim 14, wherein the bit string manipulator circuitry is designed to analyze the information to determine which of the states for the subsequent instruction is expected from no target;
linear target;
jump target; and
linear target and jump target.

16. The device as claimed in claim 1, wherein the bit string manipulator circuitry is designed to analyze the information for at least two items of information selected from the group consisting of:
parity information of the second bit string;
a current or subsequent section of the program flow;
a state of a calculation device; and
an operating state of the device or a system comprising the device.

17. The device as claimed in claim 1, wherein the bit string manipulator circuitry comprises a hardware-implemented electronic circuitry, which is designed to modify bit values of the bit string section by means of an interconnection in the electronic circuitry.

18. The device as claimed in claim 1, wherein the bit string manipulator circuitry is at least partially implemented in software.

19. A device for providing a modified program flow, comprising:
a first interface designed to receive a program flow comprising a first plurality of bit strings and store in bit string manipulator in a second memory;
bit string manipulator circuitry designed to access the second memory to manipulate at least one of the first plurality bit strings at a predetermined bit string section to insert information indicating a target state of the program flow to obtain at least one of a second plurality of modified bit strings; and
a second interface designed to output a program flow comprising the at least one of the second plurality of modified bit strings,
wherein the information is useable to access the second memory to verify during processing an integrity of the at least one of the first plurality of bit strings stored in a data memory, and if the verification indicates that the at least one of the first plurality of bit strings deviates from a predefined instruction set of the program flow, access the second memory to manipulate during processing the at least one of the first plurality of bit strings in the bit string section in the bit string manipulator circuitry to obtain the at least one of the second plurality of modified bit strings that comprises, in the bit string section, a valid instruction such that the at least one of the second plurality of modified bit strings corresponds to the predefined instruction set of the program flow for error-compensated processing.

20. A method for processing bit strings of a program flow, comprising:
access a data memory by bit string manipulator circuitry to obtain a first bit string and store in a second memory;
access the second memory to verify, by the bit string manipulator circuitry during processing, an integrity of the first bit string at a predetermined bit string section of the first bit string having information that indicates a target state of the program flow;
if the verification indicates that the first bit string deviates from a predefined instruction set of the program flow,
access the second memory to manipulate the first bit string in the bit string section in the bit string manipulator circuitry to obtain a second bit string, wherein the second bit string comprises, in the bit string section, a valid instruction such that the second bit string corresponds to the predefined instruction set of the program flow for error-compensated processing; and
outputting at an interface a signal having the second bit string.

* * * * *